W. S. McCRACKEN.
HORSESHOE.
APPLICATION FILED SEPT. 21, 1914.
1,177,958.
Patented Apr. 4, 1916.
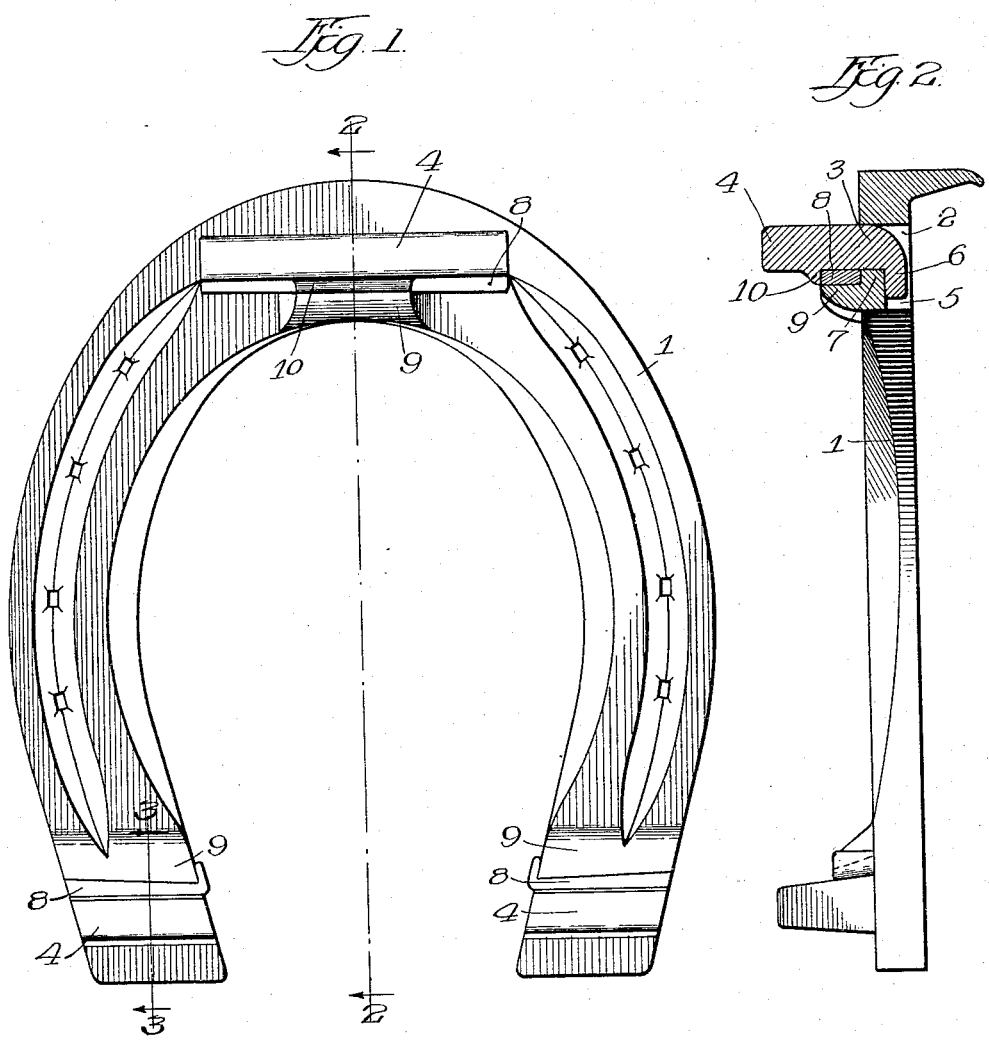

UNITED STATES PATENT OFFICE.

WILLIAM S. McCRACKEN, OF JOLIET, ILLINOIS.

HORSESHOE.

1,177,958.   Specification of Letters Patent.   Patented Apr. 4, 1916.

Application filed September 21, 1914. Serial No. 862,655.

*To all whom it may concern:*

Be it known that I, WILLIAM S. MC-CRACKEN, citizen of the United States, residing at Joliet, in the county of Will and State of Illinois, have invented a certain new and useful Improvement in Horseshoes, of which the following is a full, clear, concise, and exact description.

My invention relates to horse-shoes, and its object is to provide a horse-shoe having removable calks which can be quickly and easily replaced when worn, and in which the calks are rigidly and securely attached to the shoe.

It frequently happens that a horse so shod as to meet ordinary requirements will have to be re-shod to meet some sudden and unusual condition, as for example in the case of a sudden freeze whereby the road becomes so slippery that a horse shod with shoes having blunt calks cannot secure a firm footing. It is customary in such cases to take the horse to a blacksmith shop where the shoes are removed and replaced after being sharpened or new shoes substituted for the removed ones. At such times the unusual demand for the services of the blacksmith causes long delay in getting a horse re-shod, and it is the purpose of my invention to make it possible for the driver of a horse to quickly and easily substitute sharp calks for the blunt or worn ones without removing the shoes from the horse's feet, thereby rendering a trip to the blacksmith's shop unnecessary and also thereby saving the time ordinarily required for getting the horse re-shod.

My invention contemplates a horse-shoe provided with an opening or socket and a calk having a shank which is received by the opening or socket, the latter having a lateral recess for receiving a laterally extending projection of the shank. A wedge or key coöperates with the shoe and the calk to hold the calk securely in place.

My invention may be more readily understood by reference to the accompanying drawings, in which—

Figure 1 is a plan view of the wearing face of a horse-shoe embodying my invention; and Figs. 2 and 3 are sections on the line 2—2 and 3—3, respectively, of Fig. 1.

Similar letters of reference refer to similar parts throughout the several views.

The horse-shoe 1 at its toe and at each of its heels is provided with a slot or opening 2 which is surrounded by the wearing face of the shoe and which may extend through the shoe from one face of the shoe to the other and provides a socket for the reception of the shank 3 of a calk 4. The shank 3 projects from the body portion of the calk intermediate the ends thereof, and when it is inserted in the socket the opposite ends of the calk are seated upon the wearing face of the shoe. The socket 2 at its inner end, that is upon the side of the shoe opposite the wearing face, has a laterally extending recess 5 for the reception of a lug 6 which projects laterally from the end of the shank of the calk. The shank is, as it were, bent to provide a hook, that is the lug 6 is in hooked engagement with the wall 7 of the recess 5. By slightly tilting the calk inward its shank can be seated in the socket provided therefor. The calk is then securely held in place by a wedge or key 8. A keyway for the wedge is provided between a shoulder 9 and the face of the calk. The shoulder 9 is provided on the wearing face of the shoe and beneath the recess 5. For the purpose of holding the wedge 8 in place, the calk may be provided with a shoulder 10, as shown at the toe of the shoe in Figs. 1 and 2, or the shoulder 9 may be undercut as is shown at the heel of the shoe in Figs. 1 and 3.

The calks are preferably made of hardened steel, and are therefore very durable. The method of locking them to the shoe proper is such that the wear of the calks does not interfere with the quick removal thereof when it is desired to replace the old with new calks. Such renewal of the calks is a simple matter that does not require the services of a blacksmith.

What I claim is:—

1. The combination with a horse-shoe provided with an opening therethrough surrounded by the wearing face of the shoe, said opening having a lateral recess at its inner end, of a removable calk having its opposite ends seated upon the wearing face of the shoe and having a shank fitting in said opening, a lug extending laterally from the end of the shank into said recess whereby said calk requires lateral tilting to seat it in said opening, and a removable key for preventing said tilting and hence serving to lock said calk in place.

2. The combination with a horse-shoe provided with an opening surrounded by the wearing face of the shoe, said opening having a lateral recess at its inner end, of a removable calk having its opposite ends seated upon the wearing face of the shoe and having a shank fitting in said opening, a shoulder of said calk, a central lug extending laterally from the bottom of the shank into said recess, a shoulder upon the wearing face of the shoe near said recess, and a wedge inserted between said parts tending to draw said calk from said opening thereby causing said lug to bear against the wall of said recess forming a positive lock.

3. The combination with a horse-shoe, of a calk having a shank with a laterally bent end, said shoe having an opening in which said shank fits, a shoulder on the wearing face of the shoe, a shoulder on said calk, and a double wedging key inserted between said shoulders whereby said calk is positively locked against tilting and against withdrawal.

4. A horse-shoe calk comprising a body portion, a shank of less length than said body portion projecting from said body portion intermediate the ends thereof, whereby bearing faces are left at opposite ends thereof, and a lug extending laterally from the end of the shank.

In witness whereof, I hereunto subscribe my name this 19th day of September, A. D. 1914.

W. S. McCRACKEN.

Witnesses:
ALFRED H. MOORE,
GEORGE E. FOLK.

Copies of this patent may be obtained for five cents each, by addressing the "Commissioner of Patents, Washington, D. C."